(12) United States Patent
Zimmerman

(10) Patent No.: US 6,411,890 B1
(45) Date of Patent: Jun. 25, 2002

(54) METHOD FOR GUIDING AIRCRAFT ON TAXIWAYS

(75) Inventor: Rolf Zimmerman, Immenstaad (DE)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/555,358

(22) PCT Filed: Nov. 24, 1998

(86) PCT No.: PCT/EP98/07581

§ 371 (c)(1),
(2), (4) Date: Aug. 3, 2000

(87) PCT Pub. No.: WO99/28885

PCT Pub. Date: Jun. 10, 1999

(30) Foreign Application Priority Data

Nov. 27, 1997 (DE) .......................................... 197 52 559

(51) Int. Cl.$^7$ .............................. G08G 5/00; G01S 1/16; G01S 1/18
(52) U.S. Cl. ........................ 701/120; 701/16; 340/952; 348/116
(58) Field of Search ................................. 701/120, 117, 701/23, 28, 16, 17, 121, 122, 207, 225; 180/167, 168, 169; 348/117, 116, 144; 342/410; 340/947, 952, 953, 989; 702/94; 73/178 R, 178 T

(56) References Cited

U.S. PATENT DOCUMENTS

| | | | | | |
|---|---|---|---|---|---|
| 2,787,428 A | * | 4/1957 | Schuck | ...................... | 244/183 |
| 3,706,969 A | * | 12/1972 | Paredes | ...................... | 340/26 |
| 3,971,025 A | * | 7/1976 | Levine | ...................... | 343/108 R |
| 4,299,483 A | * | 11/1981 | Grove et al. | ................. | 356/152 |
| 4,792,904 A | * | 12/1988 | Reinagel et al. | ............. | 364/429 |
| 4,845,629 A | * | 7/1989 | Murga | ...................... | 364/439 |
| 5,166,746 A | * | 11/1992 | Sato et al. | ................... | 356/152 |
| 5,519,618 A | * | 5/1996 | Kastner et al. | ............. | 364/439 |
| 5,689,273 A | * | 11/1997 | Bailey et al. | ............... | 342/407 |
| 5,736,955 A | * | 4/1998 | Roif | ......................... | 342/33 |
| 5,894,323 A | * | 4/1999 | Kain et al. | .................. | 348/116 |
| 5,991,427 A | * | 11/1999 | Kakinami et al. | ........... | 382/104 |
| 6,064,925 A | * | 5/2000 | Kobayahi et al. | ............. | 701/23 |
| 6,138,062 A | * | 10/2000 | Usami | ........................ | 701/23 |

* cited by examiner

Primary Examiner—Tan Nguyen
Assistant Examiner—Dalena Tran

(57) ABSTRACT

The invention refers to a method for the guidance of aircraft on the taxiways (R) of the airport apron with position lights (FE) located on the taxiways (R) and, possibly, other locations on the apron. It comprises the following steps:

Figure 1:
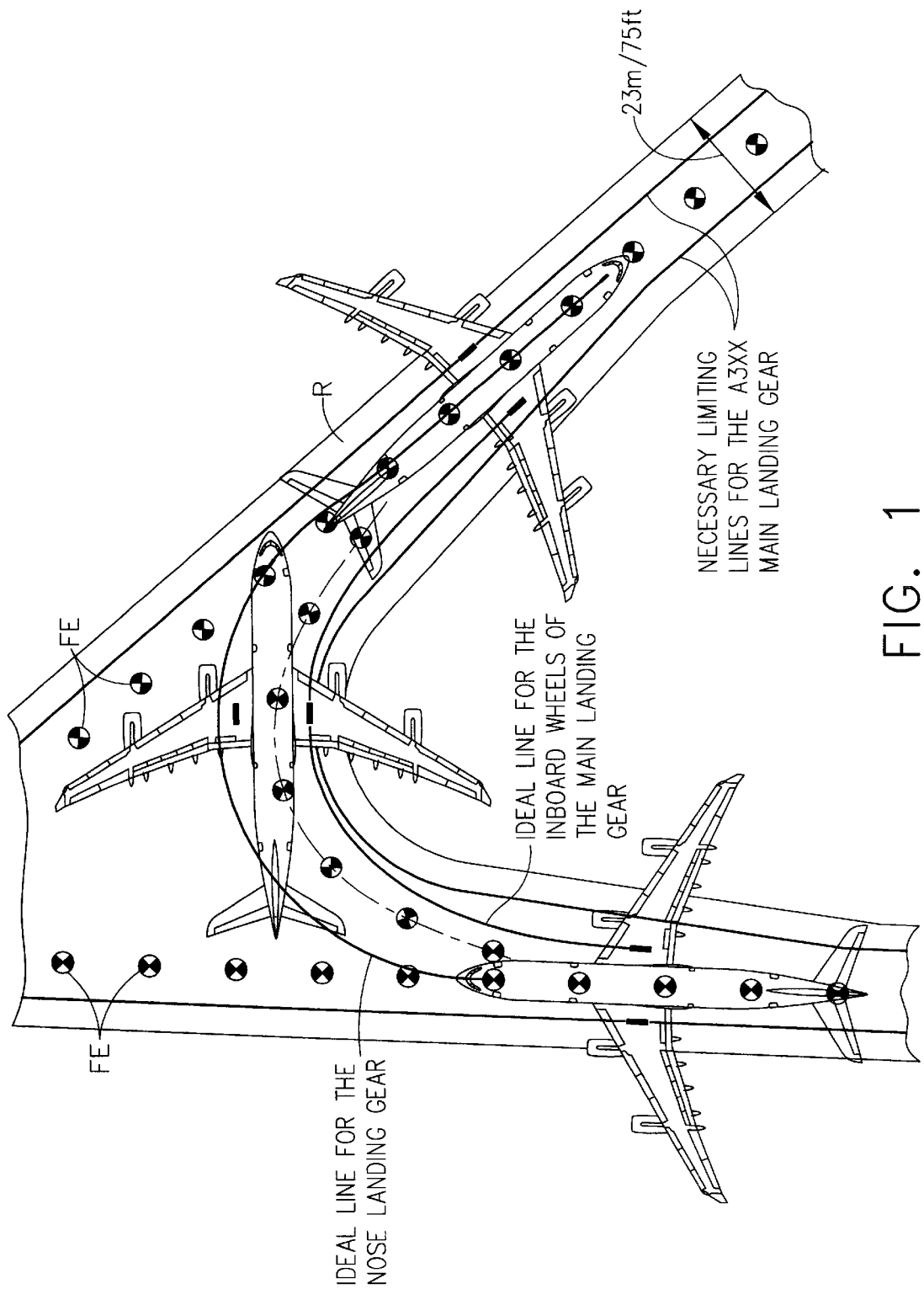

- determination of the current aircraft position with a defined precision by means of a navigation system (NAV);
- position detection and measurement of the lights by means of a sensor (SEN) arranged on the aircraft,
- provision of reference information (REF) including the positions of the individual lights (FE),
- comparison of the path pursued by the navigation system (NAV) with the reference information (REF) and utilization of the detected lights (FE) as waypoints for the navigation system (NAV), and therefrom
- determination of the current aircraft position with a higher precision than that of the original position determination by the navigation system (NAV);
- generation of guidance information (FRG) based on the determined aircraft position.

10 Claims, 2 Drawing Sheets

METHOD FOR GUIDING AIRCRAFT ON TAXIWAYS

The invention relates to a method for the guidance of aircraft on taxiways.

NLA (New Large Aircraft, e.g. Airbus A3XX) feature larger dimensions than the largest commercial aircraft, Boeing B 747, today. ICAO (International Civil Aviation Organization), ACI (Airports Council International) and aircraft manufacturers therefore are looking for solutions on how NLA can land, taxi and be dispatched on existing airports without the need for costly new constructions or modifications.

The A3XX could safely maneuver on taxiways (taxiways code E/group V) certified for the B 747, including turns and branch-offs, when the main landing gear's lateral deviation from the taxiway centerline is a maximum of 0.5 m. Turns, among other things, require considerable oversteering of the nose landing gear or steering of the nose landing gear along an invisible aircraft-specific ideal line which considerably deviates from the centerline.

A pilot is not able to achieve the required lateral precision and the taxiing along an ideal line, to be calculated for the nose landing gear, via manual control.

Navigation systems are known for road vehicles featuring the following components, among other things:

Inertial system (autonomous navigation systems based on motion sensors, e.g. wheel rotation measurement and electronic compass) with errors which, in general, are proportionate to either the distance covered since the last waypoint or to the time passed (gyro systems)

Satellite navigation system, as necessary (on account of masking and interfering multipath signal reception from various satellites; such a system can be used in road traffic only for accuracies in the range of approx. 100 m); as a rule only to support an inertial system Digital road map including storage of the course of all roads and turn-off possibilities of the road network Map matching method to continuously compare the path pursued by the inertial system with the stored road network and utilization of every tight turn and every turning-off as a waypoint for the inertial system.

An accuracy of approx. 5 m can be achieved with this combination (possibly also without satellite navigation), which is sufficient for guidance to destination (e.g. voice output to the driver "turn right after 50 m").

The object of the invention is to provide a method for the guidance of aircraft on taxiways by means of which aircraft can be guided with a lateral deviation of less than 0.5 m from the ideal line. New large aircraft, in particular, are to taxi safely on existing taxiways.

The task is achieved by means of the method according to claim 1. Advantageous designs are the subject of subclaims.

According to the invention, it is proposed to transfer the method known for the navigation of road vehicles to the guidance of aircraft on taxiways. To this effect, individual lights of the taxiway lighting (preferably the lights of the centerline lighting) are used as navigation waypoints. The system to carry out the method according to the invention, includes the following components:

aircraft-typical inertial system, e.g. an inertial navigation system. An additional, aircraft-independent navigation system, such as a satellite navigation system, however, may be used too. It is also possible to use several navigation systems in parallel. The navigation system must provide only a limited accuracy (typically 10 m), which by itself is not sufficient to solve the basic task of the invention.

storage medium with reference information, especially in the form of a digital taxiway map. It contains the precise coordinates of the rim apertures of all lights of the planned taxiways and aprons which are suitable as waypoints. The precision of the coordinates contained in the taxiway map, for instance is approx. 10 cm.

additional sensor for the detection of lights and their position measurement. The latter should be performed with a precision of approx. 10 cm. Video cameras and scanners, for example which can be advantageously arranged on the aircraft main landing gear, are suited for this task.

map-matching method for the continuous comparison of the path pursued by the inertial system with the stored taxiway network and utilization of every detected light as a waypoint for the inertial system.

Using this combination, accuracies in the aircraft position determination of markedly better than 0.5 m can be achieved, allowing an automatic lateral guidance and the correct performance of the nose landing gear oversteering.

The taxiway to be used can be chosen by pilot input (as agreed with the tower) or by data transmission from the tower. Light detection by the sensor can be facilitated in that only the lights on the planned taxiway are switched on.

The method according to the invention is not limited to NLA but can be used for all aircraft and vehicles moving on areas fitted with lights. The degree of automation may differ widely and feature the following forms:

manual taxiing by the pilot with the help of guidance information generated by the system, e.g. voice output, visible overlays in the head-up display or on a monitor, semi-automatic taxiing with automatic steering and manual longitudinal guidance (accelerating, braking) by the pilot, automatic taxiing, including monitoring by the pilot, as necessary.

Figure 2:
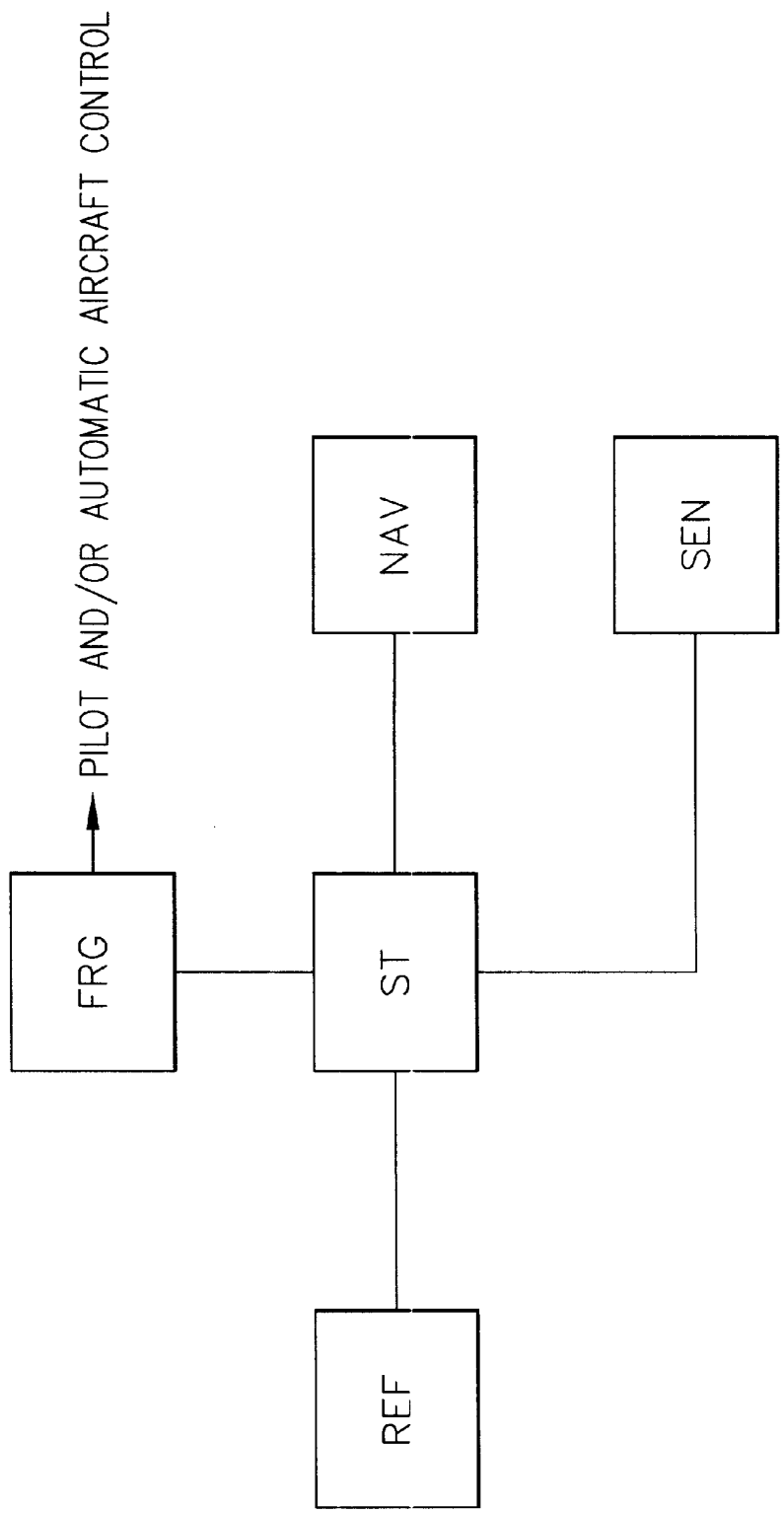

An example of the method according to the invention is described in the following, with reference to two drawings:

FIG. 1: Sketch of the guidance of an aircraft (A3XX) on a taxiway;

FIG. 2: Schematic representation of a system to carry out the method according to the invention.

FIG. 1 shows the problem on which the invention is based as described in the introduction, by the example of an Airbus A3XX, which is to be guided on the taxiway R. The dimensions chosen for taxiway R correspond to those of current airport taxiways (width: approx. 23 m). The ideal lines for the nose landing gear and for the inboard wheels of the main landing gear are shown. FE designates the lights of the centerline lighting.

The method sequence according to the invention is described by the example of FIG. 2. The current aircraft position is determined with a precision of e.g. 5 m by means of the navigation system NAV. Based on this aircraft position, the position of the light detected by the sensor SEN is determined in the control unit ST and compared with the reference information contained in the digital taxiway map REF. The latter contains the positions of all navigation-suitable lights FE (FIG. 1) with a precision of e.g. 10 cm. The allocation of a detected light to the corresponding light in the taxiway map REF is unambiguous when the range of adjacent lights is higher than the inaccuracy of the navigation system NAV (here, 5 m as indicated above). The position of the detected light taken from the reference information serves as a waypoint for the navigation system NAV. By using these waypoints the aircraft position is determined with higher precision compared to the original position determination of the navigation system. With the method described here, the aircraft position can be determined with a precision of better than 0.5 m. Using the obtained high-precision data, the guidance information is generated in the FRG unit. Depending on the degree of automation, they concern:

information for the audio or optical output to the pilot. When reaching a certain position on the taxiway, the pilot for instance is instructed to start with the nose landing gear steering.

information for the automatic nose landing gear steering, possibly combined with information for the audio or optical output to the pilot for manual longitudinal guidance (accelerating, braking) by the pilot.

information for automatic nose landing gear steering and automatic longitudinal aircraft guidance (accelerating, braking).

What is claimed is:

1. A method for guiding an aircraft on a taxiway of an airport apron comprising:
   a. providing a plurality of lights fixed along a taxiway path;
   b. determining a first set of indices indicating a first position of a taxiing aircraft, the first set of indices being determined by an aircraft navigation system and exhibiting a first precision;
   c. determining a second set of indices indicating a second position of the taxiing aircraft, the second position being detected by a sensor arranged on the taxiing aircraft and being relative to one of the lights, the second set of indices exhibiting a second precision that is more accurate than the first precision;
   d. providing reference information comprising a definition of the taxiway path and a reference position for each of the lights relative to the taxiway path; and
   e. generating guidance information based on the first set of indices, the second set of indices, and the reference information.

2. The method of claim 1 characterized in that the guidance information is transmitted to the pilot for manual aircraft control.

3. The method of claim 1 characterized in that the guidance information is used for automatic aircraft control without pilot intervention.

4. The method of claim 1 characterized in that the guidance information is used for semi-automatic aircraft control with longitudinal guidance controlled by a pilot and steering controlled automatically.

5. The method of any of claims 1 or 2 through 4 characterized in that the lights are fixed along the taxiway centerline.

6. The method of any of claims 1 or 2 through 5 characterized in that the reference information is stored in the form of a digital map.

7. The method of any of claims 1 or 2 through 6 characterized in that the sensor arranged on said taxiing aircraft is selected from the group consisting of a video camera and a scanner.

8. The method of any of claims 1 or 2 through 7 characterized in that the sensor is mounted on a landing gear of the taxiing, aircraft.

9. The method of any of claims 1 or 2 through 8 characterized in that the aircraft's navigation system is an inertial navigation system.

10. The method of any of claims 1 or 2 through 8 characterized in that the navigation system is a satellite navigation system.

* * * * *